US012699226B2

(12) United States Patent
Schweitzer et al.

(10) Patent No.: US 12,699,226 B2
(45) Date of Patent: Aug. 4, 2026

(54) FIBER OPTIC BEAM SPLITTER

(71) Applicant: NETAFIM, LTD., Tel Aviv (IL)

(72) Inventors: Abraham Schweitzer, Kibbutz Hatzerim (IL); Esteban Socolsky, Kibbutz Hatzerim (IL); Bar Israel Gazit, Kibbutz Mishmar Hanegev (IL)

(73) Assignee: Netafim Ltd., Givatayim (IL)

( * ) Notice: Subject to any disclaimer, the term of this patent is extended or adjusted under 35 U.S.C. 154(b) by 252 days.

(21) Appl. No.: 18/515,549

(22) Filed: Nov. 21, 2023

(65) Prior Publication Data

US 2024/0168244 A1 May 23, 2024

Related U.S. Application Data

(60) Provisional application No. 63/427,250, filed on Nov. 22, 2022.

(51) Int. Cl.
*G02B 6/28* (2006.01)
*G02B 6/42* (2006.01)
*H04B 10/25* (2013.01)

(52) U.S. Cl.
CPC ............. *G02B 6/2804* (2013.01); *G02B 6/28* (2013.01); *G02B 6/2808* (2013.01); *G02B 6/4202* (2013.01); *H04B 10/25891* (2020.05)

(58) Field of Classification Search
CPC ...... G02B 6/28; G02B 6/2804; G02B 6/2808; H04B 10/2589; H04B 10/25891
See application file for complete search history.

(56) References Cited

U.S. PATENT DOCUMENTS

| | | | | | |
|---|---|---|---|---|---|
| 3,983,389 | A | * | 9/1976 | Cowardin | G02B 6/2804 |
| | | | | | 250/227.13 |
| 4,135,779 | A | * | 1/1979 | Hudson | G02B 6/2804 |
| | | | | | 385/25 |
| 4,325,604 | A | * | 4/1982 | Witte | G02B 6/2804 |
| | | | | | 385/48 |
| 4,360,248 | A | * | 11/1982 | Bickel | G02B 6/2856 |
| | | | | | 156/158 |

(Continued)

FOREIGN PATENT DOCUMENTS

| | | |
|---|---|---|
| CN | 103123254 A | 5/2013 |
| CN | 103513337 A | 1/2014 |

(Continued)

*Primary Examiner* — Michael Stahl
(74) *Attorney, Agent, or Firm* — Womble Bond Dickinson (US) LLP

(57) ABSTRACT

A fiber optic beam splitter includes housing, a single first optical fiber and a pair of second optical fibers which meet and abut the single first optical fiber at inside the housing. An optical communication module includes a light-emitting diode (LED); a photodiode; and two such fiber optic beam splitters. In each beam splitter, a tip of a first of the pair of second optical fibers is connected outside of the housing to the LED, and a tip of a second of the pair of second optical fibers is connected outside of the housing to the photodiode; and a tip of the single first optical fiber which is outside of the housing, is in optical communication with an exterior of the module. An optical communication network includes two or more such optical communication modules. An irrigation system configured to support a field of crops includes such an optical communication network.

14 Claims, 4 Drawing Sheets

(56)                    References Cited

U.S. PATENT DOCUMENTS

| | | | | |
|---|---|---|---|---|
| 4,564,755 | A * | 1/1986 | Winzer | G02B 6/29368 |
| | | | | 385/44 |
| 4,593,968 | A * | 6/1986 | Giallorenzi | G02B 6/443 |
| | | | | 385/48 |
| 4,720,161 | A * | 1/1988 | Malavieille | G02B 6/3803 |
| | | | | 385/98 |
| 10,379,311 | B1 * | 8/2019 | Krywicki | G02B 6/4478 |
| 2006/0204194 | A1 * | 9/2006 | Kragl | G02B 6/25 |
| | | | | 385/123 |
| 2011/0116744 | A1 * | 5/2011 | Schunk | G02B 6/262 |
| | | | | 385/39 |
| 2011/0211832 | A1 * | 9/2011 | Schunk | G02B 6/2821 |
| | | | | 398/41 |
| 2018/0359963 | A1 * | 12/2018 | Schweitzer | A01G 25/16 |

FOREIGN PATENT DOCUMENTS

| | | | |
|---|---|---|---|
| CN | 106094110 A | 11/2016 |
| CN | 106959172 A | 7/2017 |
| CN | 109682779 A | 4/2019 |
| CN | 114593837 A | 6/2022 |

* cited by examiner

FIBER OPTIC BEAM SPLITTER

RELATED APPLICATIONS

Priority is claimed to U.S. Provisional Patent Application No. 63/427,250 filed Nov. 22, 2022. The contents of the aforementioned application are incorporated by reference in their entirety.

TECHNICAL FIELD

Embodiments of the invention relate to a fiber optic beam splitter, in particular for splitting and combining light between a single first fiber and two second fibers.

BACKGROUND

It is known to split light using a beam splitter, which is an optical device that for example splits a beam of light into a transmitted and a reflected beam. Beam splitters are used in many optical systems, such as in fiber optic telecommunication systems.

A mechanical optical splice is a junction of two or more optical fibers that are aligned and held in place by an assembly that holds the fibers in alignment with or without use of an index matching fluid. Mechanical splicing uses a small, mechanical splice to permanently join the two optical fibers, by precisely aligning two bare fibers and abutting them together.

SUMMARY OF THE INVENTION

In one aspect, the subject matter of the present application is directed to a fiber optic beam splitter including a housing, a single first optical fiber and a pair of second optical fibers which meet and abut the single first optical fiber at a location within the housing.

In another aspect, the subject matter of the present application is directed to an optical communication module which includes a light-emitting diode (LED); a photodiode; and two fiber optic beam splitters, each beam splitter comprising a housing, a single first optical fiber and a pair of second optical fibers which meet and abut the single first optical fiber at a location within the housing. In each beam splitter, a tip of a first of the pair of second optical fibers is connected outside of the housing to the LED, aa tip of a second of the pair of second optical fibers is connected outside of the housing to the photodiode; and a tip of the single first optical fiber which is outside of the housing, is in optical communication with an exterior of the module.

In yet another aspect, the subject matter of the present application is directed to an optical communication network which includes two or more such optical communication modules connected via fiber optics.

In still another aspect, the subject matter of the present application is directed to an irrigation system configured to support a field of crops comprising such an optical communication network.

BRIEF DESCRIPTION OF THE DRAWINGS

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which:

FIG. 4B schematically shows an optical communication module having two fiber optic beam splitters, while

Figure 1:
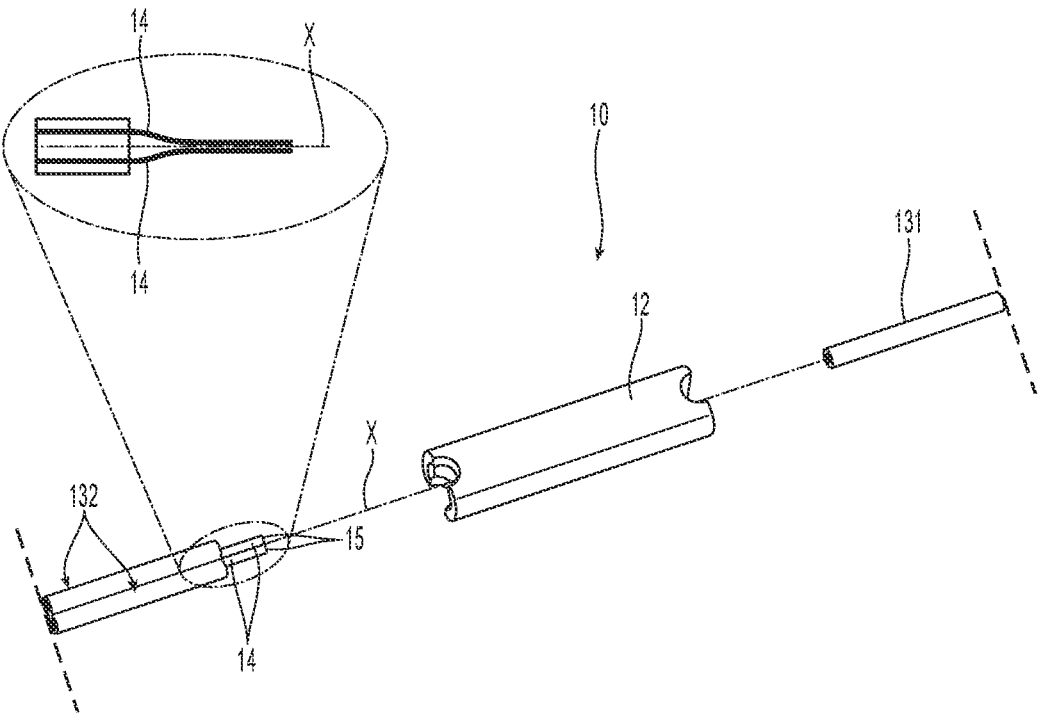
FIG. 1 schematically shows an exploded view of an embodiment of fiber optic beam splitter in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 showing an exploded view of an embodiment of a fiber optic beam splitter 10. Beam splitter 10 in this example includes a housing 12 and three optical fibers. A single first optical fiber 131 in this example can be seen entering into the housing at its one side (here right-hand side) while a pair of second optical fibers 132 enter into the housing at its other opposing side (here left-hand side). It is understood that the first optical fiber 131 and the pair of second optical fibers 132 may be made of the same material and have the same optical properties.

Figure 2:
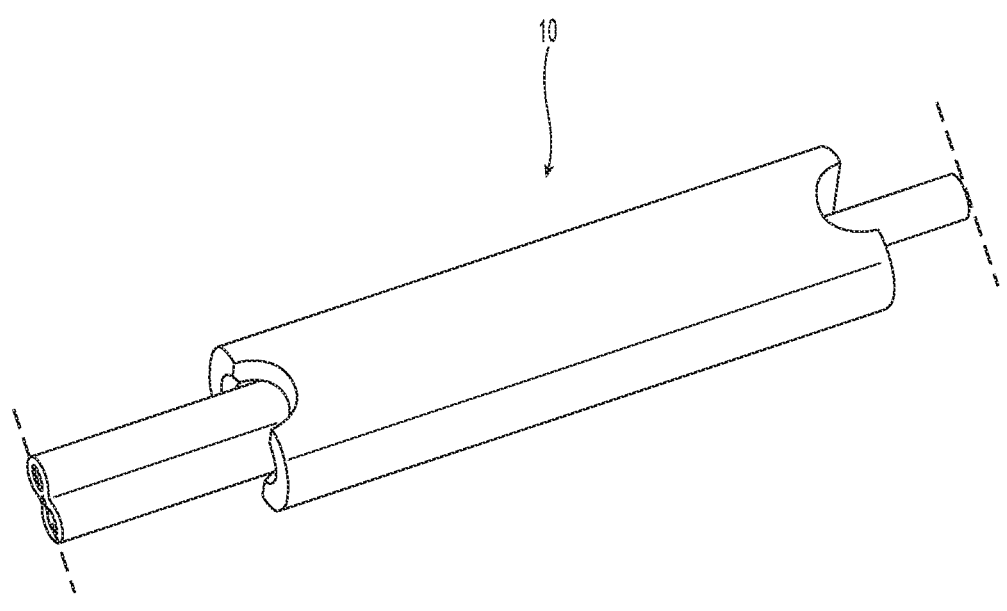
FIG. 2 schematically shows an assembled view of an embodiment of a fiber optic beam splitter in accordance with the present invention.

In FIG. 2 the beam splitter 10 is shown in an assembled state. It is noted that housing 12 may be molded onto the fibers or formed upon the fibers in any known technique.

As seen in FIG. 1, end regions of the pair of second optical fibers 132, which are designed to be placed within the housing, may be stripped from their outer coatings to leave bare core segments 14.

As best seen in the enlarged section at the upper side of FIG. 1, stripping the coatings from the pair of second optical fibers 132 may assist in positioning these bare core segments 14 close to each other with their end tips 15 facing the same axial direction. In certain cases, also the single first optical fiber 131 may be stripped from the coating in a region located within the housing.

Figures 3A, 3B:
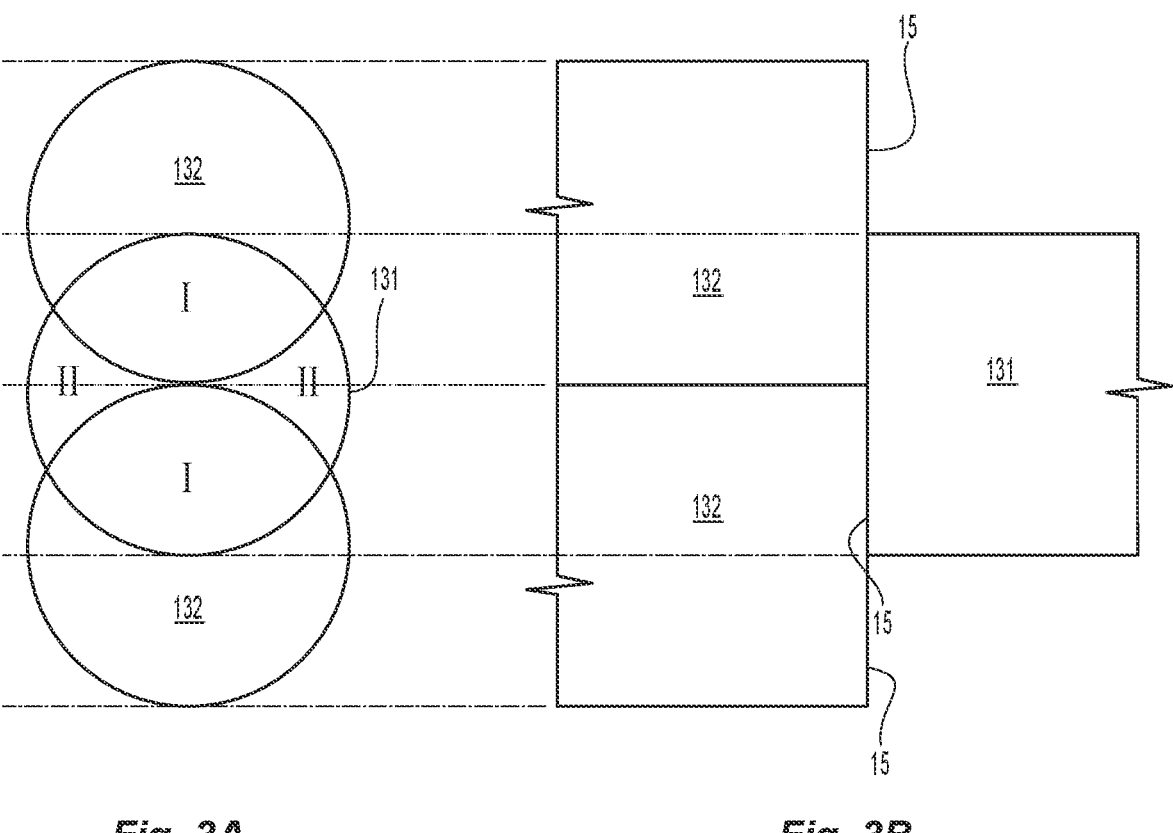
FIGS. 3A and 3B schematically shows an enlarged end view and side view, respectively, of a single first optical fiber on one side of the beam splitter and a pair of second optical fibers on the other side of the splitter in abutting engagement.

Attention is drawn to FIGS. 3A and 3B showing enlarged end and top views, respectively, the region where the pair of second optical fibers 132 and the single first optical 131 fiber form abutting engagement at their end tips 15.

FIG. 3A shows the manner in which the single first optical fiber 131 and the pair of second optical fibers 132 overlap where they abut can be seen. The overlap between each one of the second optical fibers 132 of the pair of fibers with the single first optical fiber 131 is denoted 'I', while areas of the single first optical fiber 131 that do not overlap with any second fiber on the other side are denoted 'II'. Areas II effectively are places where optical signals are lost and are not communicated onwards. Thus, at the interface between the single first optical fiber 131 and the pair of second optical fibers 132, a portion of the optical energy is lost, though the content of the optical signal is preserved, as it passes between the single first optical fiber 131 and the pair of second optical fibers 132.

Figure 4A:
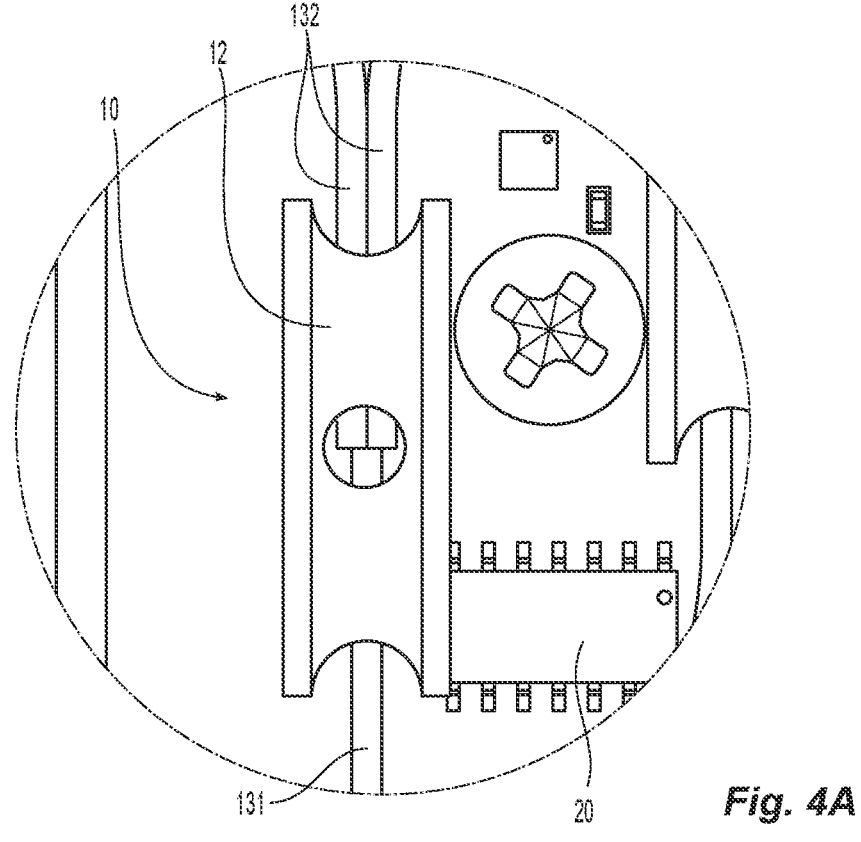
FIG. 4A shows an enlarged view of a portion of FIG. 4B.
Figure 4B:
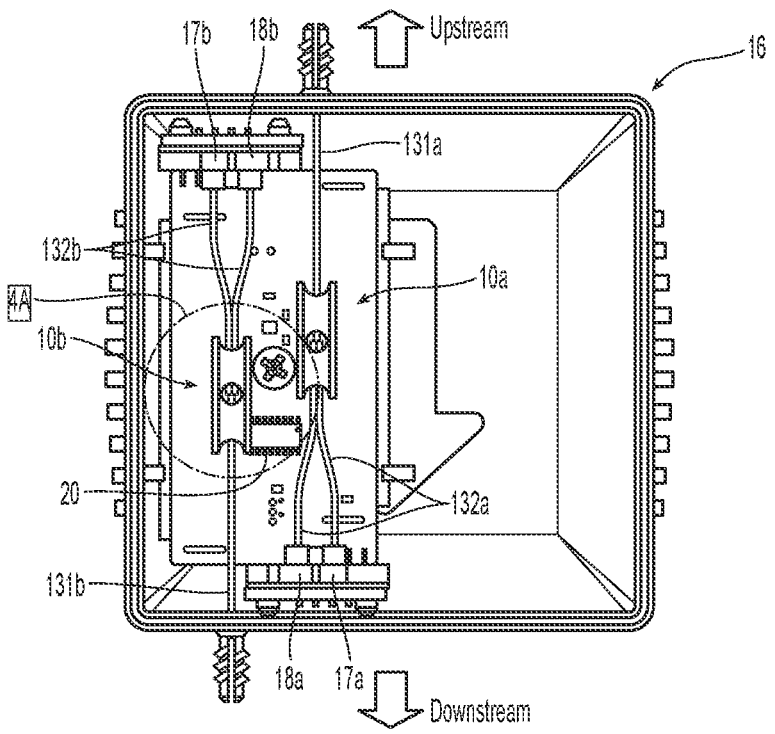

Attention is drawn to FIGS. 4A and 4B showing an example of a bidirectional communication module 16 that may make use of beam splitters 10*a*, 10*b*. In this example, two beam splitters 10*a*, 10*b* ("first" and "second", respectively) are used in module 16 for assisting in optical communication with components within the module itself and in upstream and downstream directions into and out of the module 16.

In the example here seen, the single first optical fiber 131*a* and the pair of second optical fibers 132*a* of the first splitter 10*a* are all shown being used without any coatings (i.e., also in areas outside of the housing) and hence only with their claddings.

The module 16 also has a second splitter 10*b* which also comprises a single first optical fiber 131*b* and a pair of second optical fibers 132*b*.

In this example, in each beam splitter 10*a*, 10*b*, one (a "first") second optical fiber of each pair of second optical fibers 132*a*, 132*b* is connected to a corresponding LED 17*a*, 17*b* while the other (a "second") optical fiber of each pair of second optical fibers 132*a*, 132*b* is connected to a corresponding photodiode 18*a*, 18*b*. The single first optical fiber 131*a*, 131*b* of each beam splitter 10*a*, 10*b* on the other hand is configured in this example to lead optical signals into or out of the module 16, as the case may be.

Also seen in FIGS. 4A and 4B is a microcontroller 20 that is configured to receive and communicate commands for the operation of the module in response to optical signals that are communicated in and out of the module.

Figure 5:
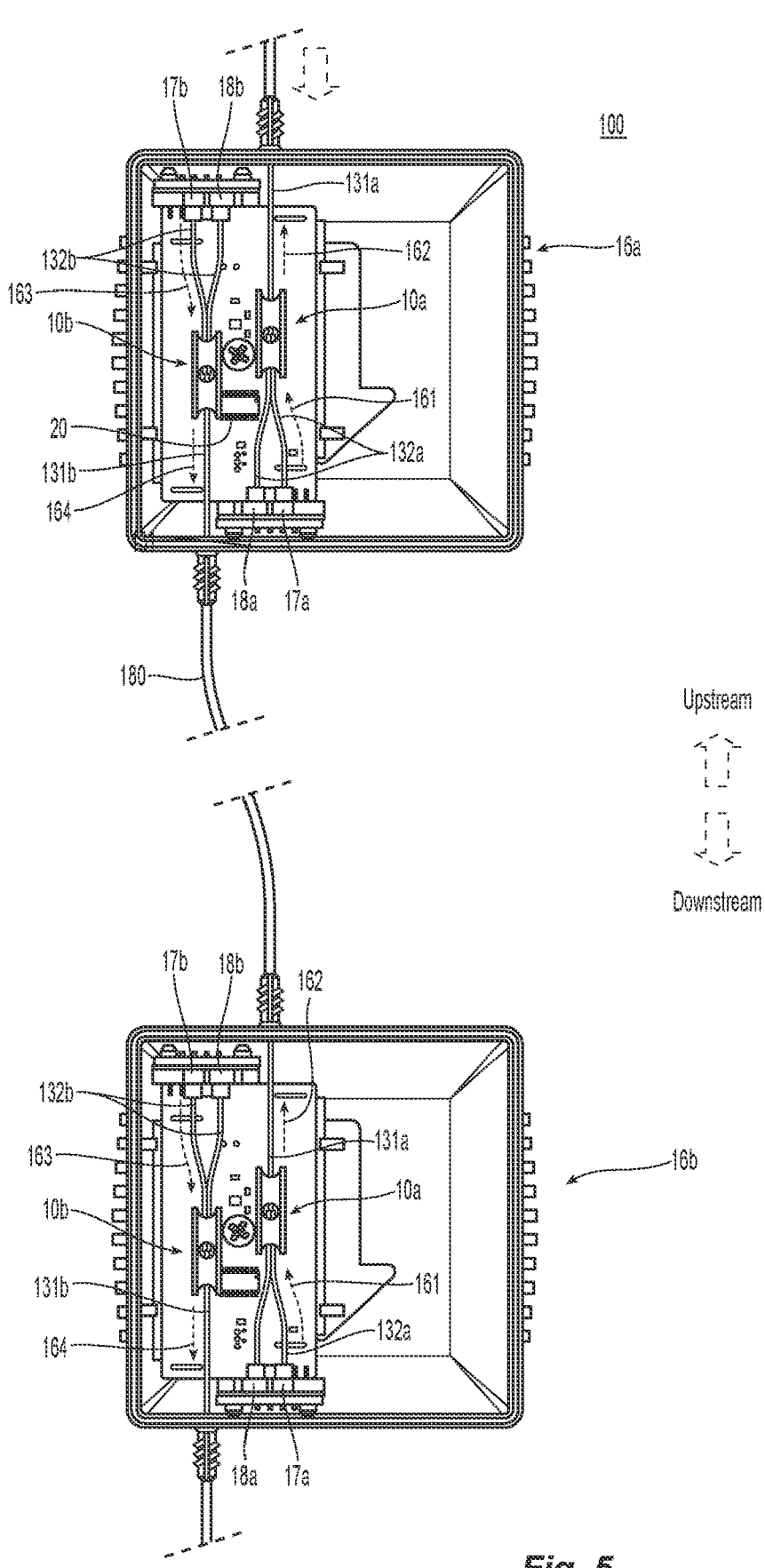
FIG. 5 schematically shows an optical communication network which includes two optical communication modules such as those seen in FIG. 4B being interconnected by optical fibers.

FIG. 5 shows a system 100 incorporating two such modules 16*a*, 16*b* connected by optical fibers 180. The operation of the modules 16*a*, 16*b* and the beam splitters 10*a*, 10*b* in each module will be discussed.

It is noted that the system 100 discussed with respect to FIG. 5 demonstrates a half-duplex (or semi-duplex) communication system, where communication between such modules 16*a*, 16*b* may be provided in either upstream or downstream directions, however not simultaneously in both these directions.

Implementing such a communication system typically enables use of a simpler and more reliable architecture that may be advantageous in certain environments where such optical communication may be needed. For example, such simpler architecture may be useful in an irrigation system that is laid for relative long durations of time in a field with exposure to varying environmental conditions.

In such an irrigation system, the distance between adjacent modules 16*a*, 16*b*, etc., may depend on the crop, the type(s) of irrigation equipment (main pipes, branch pipes, sprinklers, drip emitters, etc.) controlled by the microcontrollers, and other factors. Also the modules 16*a*, 16*b*, may be buried in the soil, lay on top of the soil, or be suspended over the soil depending on the application. Also, the fiber optical cables connecting the various modules 16*a*, 16*b* may travel along irrigation pipes supplying liquids, nutrients, and the like to crops.

The 'dotted' arrow at the upper side of the figure, exemplifies a situation where a downstream directed incoming optical signal arriving from upstream enters into the first ("upstream") module 16*a*.

The optical signal then passes through the single first optical fiber 131*a* of the right-hand side beam splitter 10*a* and continues downstream via each one of the two second optical fibers 132*a* towards the LED 17*a* and photodiode 18*a*, respectively.

The optical signal arriving at the LED 17*a* does not trigger any outcome, however the optical signal arriving at the photodiode 18*a* is communicated towards the microcontroller 20 where the signal is assessed.

The microcontroller 20, by interpreting data embedded in the arriving optical signal, may control various functions within the first module 16*a*.

In case the interpreted data dictates sending a signal back upstream out of the first module 16*a*, then the microcontroller 20 may control the LED 17*a* connected to the right-hand side (first) beam splitter 10*a* to emit a given optical signal upstream via the particular one of the pair second optical fibers 132*a* connected to it, as indicated by the first 'dotted' arrow 161. This signal may then be communicated by the first beam splitter 10*a* via its single first optical fiber 131*a* in the upstream direction out of the first module 16*a* as indicated by the second 'dotted' arrow 162.

If on the other hand, the interpreted data dictates sending a signal back downstream out of first module 16*a* towards the second ("downstream") module 16*b*, then the microcontroller 20 within first ("upstream") module 16*a* may control the downstream LED 17*b* connected to the left-hand side (second) beam splitter 10*b*, to emit a given optical signal downstream via the particular one of the pair second optical fibers 132*b* connected to it as indicated by the third 'dashed' arrow 163. This signal may then be communicated by the second beam splitter 10*b* via its single first optical fiber 131*b* in the downstream direction out of the first module 16*a*, as indicated by the fourth 'dashed' arrow 164. The optical signal then travels into an inter-module optical link 180 connecting the two modules 16*a*, 16*b*.

In the description and claims of the present application, each of the verbs, "comprise", "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. A fiber optic beam splitter comprising:
a housing;
a single first optical fiber; and
a pair of second optical fibers which meet and abut the single first optical fiber at a location within the housing, the abutment being between end tips of the pair of second optical fibers and an end tip of the single first optical fiber, the housing overmolded over the single first optical fiber and the pair of second optical fibers.

2. The beam splitter of claim 1, wherein each optical fiber of the pair of second optical fibers only partially abuts the single first optical fiber.

3. The beam splitter of claim 1, wherein the pair of second optical fibers extend alongside each other within the housing towards the location where they meet and abut the single first optical fiber.

4. A fiber optic beam splitter comprising:
a housing;
a single first optical fiber;
a pair of second optical fibers which meet and abut the single first optical fiber at a location within the housing, the housing overmolded over the single first optical fiber and the pair of second optical fibers; and
an optical adhesive at the location where the pair of second optical fibers meet and abut the single first optical fiber.

5. The beam splitter of claim 4, wherein a refractive index of the optical adhesive is equal to a refractive index of the pair of second optical fibers and the single first optical fiber.

6. The beam splitter of claim 1, wherein the pair of second optical fibers and the single first optical fiber, are made from plastic material.

7. The beam splitter of claim 1, wherein the pair of second optical fibers and the single first optical fiber, are uncoated.

8. The beam splitter of claim 1, wherein:
each optical fiber of the pair of second optical fibers only partially abuts the single first optical fiber;
the pair of second optical fibers extend alongside each other within the housing towards the location where they meet and abut the single first optical fiber;
an optical adhesive is located where the pair of second optical fibers meet and abut the single first optical fiber;
a refractive index of the optical adhesive is equal to a refractive index of the pair of second optical fibers and the single first optical fiber;
the pair of second optical fibers and the single first optical fiber, are made from plastic material.

9. An optical communication module comprising:
first and second fiber optic beam splitters, each beam splitter comprising a housing, a single first optical fiber and a pair of second optical fibers which meet and abut the single first optical fiber at a location within the housing, the housing overmolded over the single first optical fiber and the pair of second optical fibers;
a first light emitting diode (LED) and a first photodiode connected to the first fiber optic beam splitter;

a second light emitting diode (LED) and a second photodiode connected to the second fiber optic beam splitter;
wherein for the first beam splitter:
a tip of a first of the pair of second optical fibers is connected outside of the housing to the first LED;
a tip of a second of the pair of second optical fibers is connected outside of the housing to the first photodiode; and
a tip of the single first optical fiber, which tip is outside of the housing, is in optical communication with an exterior of the module;
wherein for the second beam splitter:
a tip of a first of the pair of second optical fibers is connected outside of the housing to the second LED;
a tip of a second of the pair of second optical fibers is connected outside of the housing to the second photodiode; and
a tip of the single first optical fiber, which tip is outside of the housing, is in optical communication with an exterior of the module.

10. The optical communication module according to claim 9, further comprising a microcontroller connected to both of the fiber optic beam splitters.

11. An optical communication network comprising:
first and second optical communication modules, each in accordance with claim 10, the first optical communication module being upstream of the second optical communication module; and
optical fiber connecting the single first optical fiber of the second beam splitter of the first optical communication module, and the single first optical fiber of the first beam splitter of the second optical communication module.

12. The optical communication network of claim 11, configured to support a half-duplex communication architecture of optical signals through the first and second optical communication modules.

13. The optical communication network of claim 11, wherein:
in response to a first incoming signal, the microcontroller of the first optical communication module is configured to control the LED connected to the first beam splitter to emit a first optical signal out of the first module in the upstream direction via (i) the first of the pair of second optical fibers, and (ii) the single first optical fiber, of the first beam splitter; and
in response to a second incoming signal, the microcontroller of the first optical communication module is configured to control the LED connected to the second beam splitter to emit a second optical signal out of the first module in the downstream direction towards the second optical module via (i) the first of the pair of second optical fibers, and (ii) the single first optical fiber, of the second beam splitter.

14. An irrigation system comprising the optical communication network of claim 11.

* * * * *